A. HIGLEY.

Assignor to THE HIGLEY CAR JOURNAL CO.

Car-Truck.

No. 8,381. Reissued Aug. 20, 1878.

*Witnesses.*

Geo. W. Benner

H. G. England.

*Inventor:*

Aaron Higley

Per Burridge & Co

Attys

THE NORRIS PETERS CO., PHOTO-LITH., WASHINGTON, D. C.

UNITED STATES PATENT OFFICE.

AARON HIGLEY, OF CLEVELAND, OHIO, ASSIGNOR TO THE HIGLEY CAR JOURNAL COMPANY, OF SAME PLACE.

IMPROVEMENT IN CAR-TRUCKS.

Specification forming part of Letters Patent No. 99,774, dated February 15, 1870; Reissue No. 5,452, dated June 17, 1873; Reissue No. 8,381, dated August 20, 1878; application filed June 3, 1878.

*To all whom it may concern:*

Be it known that I, AARON HIGLEY, of Cleveland, Cuyahoga county, and State of Ohio, have invented certain Improvements in Railroad-Car Trucks; and I do hereby declare that the following is a full, clear, and exact description thereof, reference being had to the annexed drawings, making part of the same.

This invention relates to a truck and the method of connecting it to the car-body by means of posts or rods extending from the car-frame to the brace or braces, whereby the ordinary jaws are dispensed with and the posts substituted in place thereof. These jaws, which are bolted to the sill or frame, soon become loose and out of line by continual jarring and strain; also, water or dampness enters between the jaws, its bolts, and the ribs, causing the wood to decay from its fastenings, thereby damaging the car and rendering it insecure. These objections are obviated by the method of connecting the truck to the car with the posts, in the manner described.

It also relates to the connection of the truck to the car-body, arranged in such relation to each other that the body of the car, when on the truck, shall have a longitudinal and transverse freedom of movement, thereby relieving the body of the car from sudden and violent shocks while in motion and in stopping and starting.

This invention further relates to the securing of a swing motion, by means of a spring or springs interposed between the body and truck of the car, one end of each spring being so secured as to move with the body of the car, while the other or lower end of the spring is connected with and controlled by the truck, allowing the body and car-truck to move, one independently of the other, as herein set forth.

Figure 1:
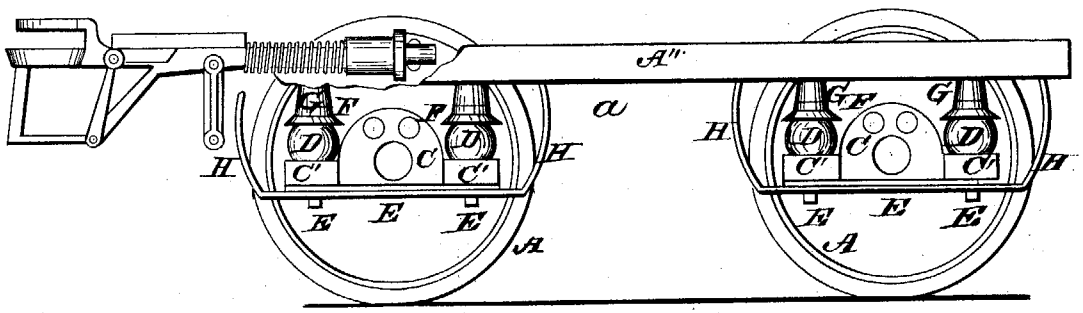
Figure 3:
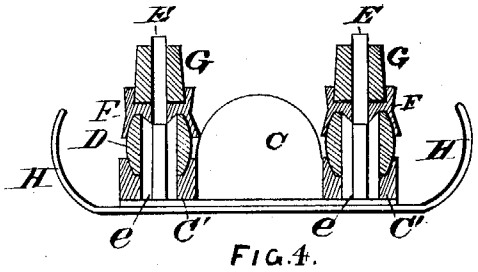
Figure 4:
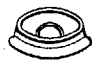
Figure 2:
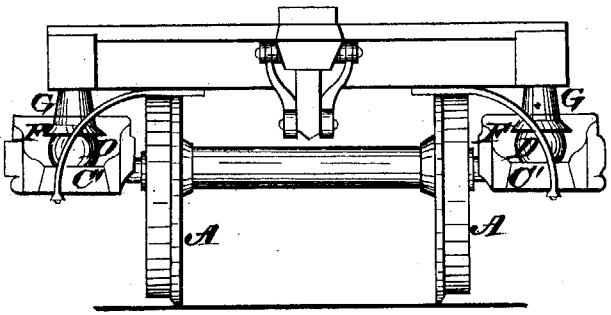

Figure 1 is a side view of a car-truck. Fig. 2 is an end view of the same. Fig. 3 is a vertical section of some of the details on an enlarged scale, and Fig. 4 is a perspective view of the spring-cap or collar.

Like letters of reference refer to like parts in the several views.

What is designed to be designated as the truck *a* consists of the axle, wheels, boxes, springs, posts, braces, arms, &c. The wheels A of the truck are connected with the axles, on which rest the axle bearings or housing C. To each end of the bearings C are arms or projections C′, on which rests the bottom of the spring or springs D.

F is a cap or disk, resting upon the top of spring D, and having a flange projecting over the top edge of the spring, and a hub extending into the interior of said spring. On the top of the cap F is placed the spring G, on which rests the sill or frame A″ of the car. The cap F may or may not have flanges to receive the springs.

E represents the stay post or posts, the tops of which are fastened rigidly to the sills of the car, and the lower parts of each post are held at right angles to the sill of the car-body by means of the stay-brace H, which brace is fastened to the base of said posts and to the frame or sills of the car-body. A spring, G, and a cap, F, surround each post E, there being play enough, however, to allow them to work up and down easily, according to the motion of the car and truck. In each projection C′ is a hole, through which the post E passes, the hole being enough larger than the post to allow the body of the car to swing freely. Also, in the spring D there is a hole, having a space, *e*, between the spring and post, as seen in Fig. 3, which allows the post to move with the car-body, said posts being held in the center of the top of spring D by means of the cap F.

It will be observed that the top of the spring D is always held in the same relative position with the body of the car by means of the caps or collar F and the posts E, the posts being rigidly fastened to the frame of the car-body, and the bottom of each spring D being always held in the same relative position with the journal-bearings and car-truck by means of a recess in the arms C′, there being space to admit of play between the post and the sides of the hole in the arm C′ and in the spring D, while, by means of the elastic nature of the springs D, the body of the car and the truck can move, one independently of the other. By this arrangement ample lateral play is given to secure an easy and comfortable motion to the car-body.

The spring D and arms C′ of the axle-box, through which the post passes to the stay-brace H, being loosely fitted about the post, will, in consequence, allow the frame A″ or car-body a longitudinal and lateral movement, thereby allowing it to sway gently and easily to the varied end and sidewise movements of the wheels, thus relieving the car from all violent and sudden shocks while in motion and in stopping and starting, and at the same time the nature of the springs gives to the car an easy and gentle support and spring to its vertical movement. It also permits the car to pass over the curves of a road with more ease and less strain than cars of the usual construction.

What I claim as my invention, and desire to secure by Letters Patent, is—

1. In railway-car trucks, the posts E E, rigidly attached to the car-frame at top, and at the bottom to the brace H, surrounded by and in combination with one or more springs, D G, placed between the car-frame and journal-box, substantially as and for the purpose described.

2. The combination of the springs D G and collar F with the arms C′, stay-braces H, and post E, connected and arranged to operate in the manner and for the purpose substantially as specified.

3. The cap or collar F, in combination with the springs D and G, as and for the purpose substantially as set forth.

4. The combination of the post E, cap F, and spring D, the post being connected rigidly with the brace and frame A″, substantially as and for the purpose set forth.

5. In journal-boxes for railway-car trucks, projections C′, with one or more springs stepped thereon, extending to and supporting the car-body, and posts E, passing through said projections, and springs rigidly attached to the frame at their upper ends, and connected with the stay-braces at their lower ends, constructed and arranged substantially as and for the purpose described.

AARON HIGLEY.

Witnesses:
W. H. BURRIDGE,
GEO. H. WERNER.